(12) United States Patent
Budzen

(10) Patent No.: US 11,228,181 B2
(45) Date of Patent: Jan. 18, 2022

(54) METHOD FOR CONTROLLING THE POWER OF A SYSTEM, AND DEVICE FOR CONTROLLING THE POWER OF A SYSTEM

(71) Applicant: SEW-EURODRIVE GMBH & CO. KG, Bruchsal (DE)

(72) Inventor: Harald Budzen, Landau (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 749 days.

(21) Appl. No.: 14/904,301

(22) PCT Filed: Jun. 12, 2014

(86) PCT No.: PCT/EP2014/001595
§ 371 (c)(1),
(2) Date: Jan. 11, 2016

(87) PCT Pub. No.: WO2015/003771
PCT Pub. Date: Jan. 15, 2015

(65) Prior Publication Data
US 2016/0134119 A1    May 12, 2016

(30) Foreign Application Priority Data

Jul. 9, 2013   (DE) ..................... 10 2013 011 384.9
Mar. 10, 2014  (DE) ..................... 10 2014 003 054.7

(51) Int. Cl.
*H02J 1/10*     (2006.01)
*H02J 3/06*     (2006.01)
(Continued)

(52) U.S. Cl.
CPC ............... *H02J 3/383* (2013.01); *H02J 3/28* (2013.01); *H02J 3/382* (2013.01); *H02J 7/35* (2013.01); *Y02E 10/56* (2013.01)

(58) Field of Classification Search
CPC .... H02J 3/383; H02J 3/28; H02J 3/382; H02J 7/35; Y02E 10/566; Y02E 10/563
(Continued)

(56) References Cited

U.S. PATENT DOCUMENTS 9,523,991 B2 * 12/2016 Baba ..................... H02J 3/46
2010/0262312 A1  10/2010 Kubota et al.
(Continued)

FOREIGN PATENT DOCUMENTS

DE   20 2012 004 269    6/2012
DE   10 2011 111 192    2/2013
(Continued)

OTHER PUBLICATIONS

International Preliminary Report on Patentability, dated Jan. 28, 2016, issued in PCT/EP2014/001595.
(Continued)

*Primary Examiner* — Richard Tan
(74) *Attorney, Agent, or Firm* — Carter DeLuca & Farrell LLP

(57) ABSTRACT

A method for controlling the power of a system, and a device for controlling the power of a system, the system having an electric energy source, electric consumers, an energy storage, an inverter, and a charge controller, the system being (Continued)

connected via an interconnected power sensor to the in particular public AC electric power supply, and the power sensor may be used for ascertaining the power withdrawn by the system from the in particular public AC electric power supply, or for ascertaining a corresponding quantity, such as the active power withdrawn from the in particular public AC electric power supply, the sensor signal being transmitted to a controller which regulates the power withdrawn from the in particular public AC electric power supply toward zero by appropriate actuation of the inverter and the charge controller.

16 Claims, 1 Drawing Sheet

(51) Int. Cl.
    *H02J 3/46*     (2006.01)
    *H02J 3/38*     (2006.01)
    *H02J 7/35*     (2006.01)
    *H02J 3/28*     (2006.01)

(58) Field of Classification Search
    USPC .......................................................... 307/20
    See application file for complete search history.

(56) References Cited

U.S. PATENT DOCUMENTS

| | | |
|---|---|---|
| 2012/0229077 A1 | 9/2012 | Tsuchiya |
| 2012/0256487 A1* | 10/2012 | Yamada ............... H01M 10/44 307/43 |
| 2013/0154570 A1* | 6/2013 | Nomura ................ H02J 3/32 320/128 |
| 2013/0264865 A1* | 10/2013 | Sugeno ................ H02J 3/32 307/9.1 |
| 2014/0167505 A1 | 6/2014 | Beck |
| 2014/0169053 A1* | 6/2014 | Ilic ................ H02M 7/53873 363/132 |

FOREIGN PATENT DOCUMENTS

| | | |
|---|---|---|
| EP | 2 469 238 | 6/2012 |
| EP | 2469238 * | 6/2012 |
| WO | 2013/080835 A1 | 6/2013 |

OTHER PUBLICATIONS

International Search Report, dated Aug. 28, 2014, issued in corresponding International Application No. PCT/EP2014/001595.

* cited by examiner

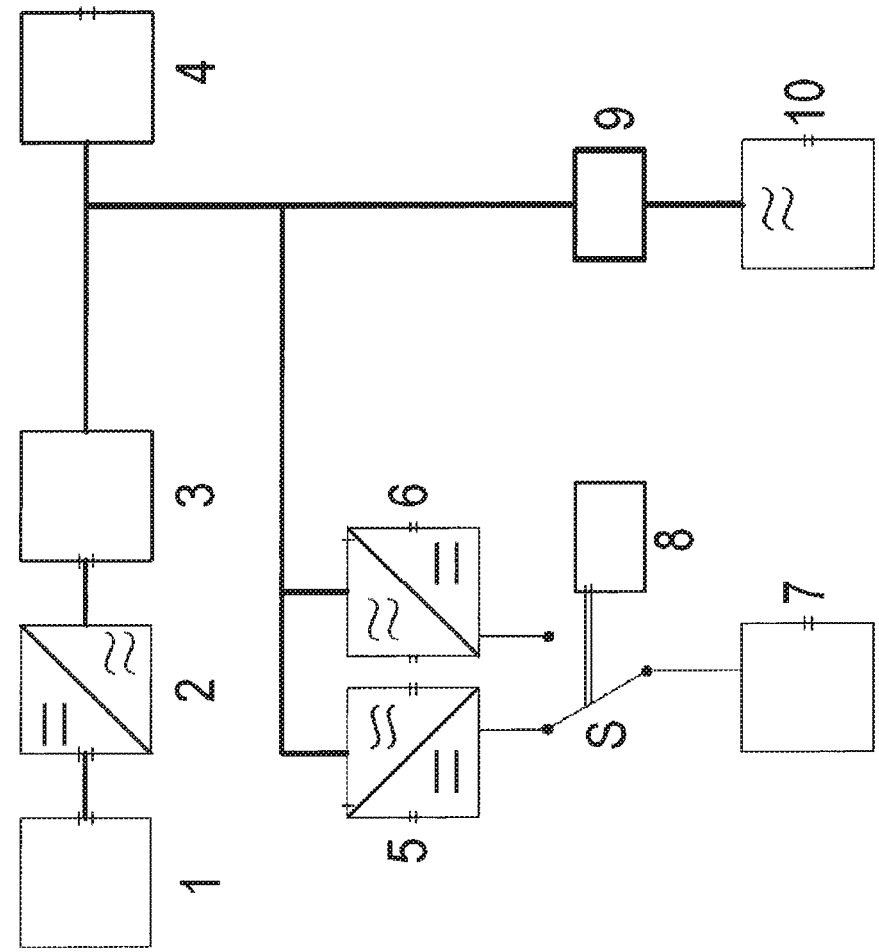

METHOD FOR CONTROLLING THE POWER OF A SYSTEM, AND DEVICE FOR CONTROLLING THE POWER OF A SYSTEM

FIELD OF THE INVENTION

The present invention relates to a method for controlling the power of a system and to a device for controlling the power of a system.

BACKGROUND INFORMATION

It is generally known that power can be injected into the in particular public AC electric power supply with the aid of photovoltaic systems. However, if no solar radiation exists, consumers must be supplied from the in particular public AC electric power supply.

SUMMARY

Therefore, it is the object of the present invention to improve the power control in the photovoltaic system.

Features in the method for controlling the power of a system include the system having an electric energy source, electric consumers, an energy storage, an inverter, and a charge controller, the system is connected to the in particular public AC electric power supply via an interconnected power sensor, and the power sensor may be used for ascertaining the power withdrawn by the system from the in particular public AC electric power supply, or for ascertaining a corresponding quantity, such as the active power withdrawn from the in particular public AC electric power supply, the sensor signal is transmitted to a controller, which regulates the power withdrawn from the in particular public AC electric power supply toward zero by an appropriate actuation of the inverter and the charge controller.

This has the advantage that an energy storage of the fluctuating photovoltaically generated power for buffering the fluctuating power flows is usable. Thus, preferably an energy storage is chargeable, and the in particular public AC electric power supply is not used for the supply.

This makes it possible to create an especially effective smart grid, and the cross-sections of the connecting cables to the in particular public AC power supply are able to be reduced, which saves copper.

In one advantageous development, the energy source is a photovoltaic system or some other regenerative energy source such as wind power. This has the advantage that the energy source is volatile, i.e., intermittently generates high power and intermittently low or no power. Buffering by means of the energy storage is therefore able to be implemented, so that a low energy withdrawal from the in particular public AC power supply is required despite the volatility of the energy source.

In one advantageous development, inverters and charge controllers are activated alternatively. This has the advantage that energy from the energy storage in the form of an AC voltage can be provided for the consumers with the aid of the inverter. The inverter may be designed in such a way that it supplies a single-phase or also a three-phased AC voltage at its AC-side terminal. The alternatively activatable charge controller controls the charging of the energy storage and is able to be supplied from the alternating current of the system that is generated photovoltaically. The charge control takes place either according to a CV method or a CC method.

In one advantageous development, if the pholtovoltaically generated electric power exceeds the power of the consumers, the controller controls the charge controller in such a way that excess power is routed to the energy store and only power that is in excess thereof is fed into the in particular public AC electric power supply, the inverter in particular being switched into a quiescent state, deactivated and/or switched off beforehand by the controller. This has the advantage that an injection into the in particular public AC electric power supply is actually possible, but the energy store is charged first before doing so, and only if the photovoltaically generated power exceeds the charge power will power be injected into the in particular public AC electric power supply.

In one advantageous development, if the photovoltaically generated electric power drops below the power of the consumers, the controller controls the inverter in such a way that the consumers are supplied with power from the energy storage, the controller in particular switching the charge controller into a quiescent state, deactivates and/or switches it off beforehand, in particular only the electric power required in excess thereof being withdrawn from the in particular public AC electric power supply. This has the advantage that the energy withdrawal and thus the energy costs are able to be kept low.

In one advantageous development, the controller has a filter, and/or an ON-delay means is situated in the control path from the controller to the charge controller and/or inverter. This has the advantage that an optimized development is realizable and the components of the system can be protected.

In one advantageous development, a hysteresis is taken into account when actuating the charge controller and/or inverter. This is advantageous insofar as resonant vibrations of the system can be prevented.

In one advantageous development, a signal electronics system of the inverter, in particular a signal electronics system situated in the housing of the inverter, implements a charge control for the energy storage. This is advantageous because no additional signal electronics are required.

In one advantageous development, a sensor for detecting a temperature of the energy storage is provided, and the sensor signal is supplied to a signal electronics system of the inverter, so that a temperature-dependent charge control is able to be realized for the energy storage. This has the advantage that the charge management can be carried out by the signal electronics system of the inverter. To do so, the signal electronics system preferably includes a memory in which data, parameters and programs are storable and are able to be implemented with the aid of the signal electronics system, in particular its microcontroller. As a result, the microcontroller also assumes the charge management in order to generate the pulse-width-modulated actuating signals of the inverter.

Important features of the device for controlling the power of a system, in particular for executing the aforementioned method, are that the system encompasses an electric energy source, an electric consumer, an energy storage, an inverter, and a charge controller, a power sensor is interconnected between the system and the in particular public AC electric power supply, and the power sensor in particular can be used for ascertaining the power withdrawn by the system from the in particular AC supply network, or for ascertaining a corresponding quantity, such as the active power withdrawn from the in particular public AC electric power supply, the sensor signal, i.e., in particular the signal from the power sensor, is supplied to a controller, in particular a housing situated in the signal electronics system, which controls the power withdrawn from the in particular public AC electric energy supply towards zero by appropriate control of the inverter and/or the charge controller via a control path.

This has the advantage that the withdrawal from the in particular public AC electric power supply is able to be kept as low as possible and the energy costs are also kept to a minimum.

In one advantageous development, the control path from the direction of the controller has a selector switch, so that either the inverter or the charge controller is activated, in particular a hysteresis being provided during the actuation, in particular an ON-delay means being situated in the control path from the controller to the charge controller and/or inverter. This has the advantage that either charging of the energy storage or a supply of the system can be implemented.

In one advantageous development, a signal electronics system of the inverter is situated inside the housing of the inverter. This is advantageous insofar as no further signal electronics system is required, but a standard voltage-controllable frequency inverter may be used instead. The frequency inverter includes means for detecting the output current.

In one advantageous development, a sensor for detecting a temperature of the energy storage is provided, and the sensor signal is supplied to a signal electronics system of the inverter, so that a temperature-dependent charge control is able to be implemented for the energy storage. This has the advantage that the signal electronics system is able to implement the charge management, in particular taking the temperature of the energy storage into account, in addition to the control and generation of the actuating signals for the inverter. Moreover, a means for limiting the current is additionally provided in integrated form in the signal electronics system.

Further advantages are derived from the dependent claims. The present invention is not restricted to the feature combination of the claims. A person skilled in the art will discover additional meaningful possibilities for combining claims and/or individual claim features and/or features of the specification and/or of the figures, that arise in particular from the stated objective and/or the objective resulting from a comparison with the related art.

BRIEF DESCRIPTION OF THE DRAWINGS

The FIGURE illustrates a schematic structure of a system according to the present invention.

DETAILED DESCRIPTION

Using a photovoltaic system 1, which in particular includes solar modules, a direct current is generated, the direct current being supplied to an inverter 2, which generates an alternating voltage. An input counter 3, which detects the electric energy made available, is situated at the output of inverter 2.

Consumers 4, in particular a washing machine, a refrigerator, an electric automobile, are supplyable at the output of the inverter. Inverter 2 synchronizes the voltage it has generated to the voltage of the in particular public AC electric power supply 10.

A four-quadrant energy counter 9, especially an active power sensor, is situated between the in particular public AC electric power supply 10 and the output of inverter 2 and/or input counter 3. Utilizing this four-quadrant energy counter 9, it is therefore detectable whether an energy withdrawal from the in particular public AC electric power supply 10 or an energy supply to the in particular public AC electric power supply 10 is taking place. In other words, the direction of the energy flow from the system into the in particular public AC electric power supply 10 or from the in particular public AC electric power supply 10 into the system is detected.

Depending on the detected active power and/or the direction of the energy flow, a switch S is actuated, which activates either a charge controller 5, especially including a rectifier, or an inverter 6.

Charge controller 5 supplies energy storage 7 with current injected by inverter 2 in order to charge it, provided it is activated.

When inverter 6 is activated, energy storage 7 is discharged by supplying the DC-side terminal of inverter 6 from there. At its AC voltage output, inverter 6 supplies the system, i.e., especially the consumers, with an alternating voltage. This makes it possible to supply the consumers from energy storage 7 via inverter 6, and the withdrawal from the in particular public AC electric energy supply 10 is kept to a minimum.

That is to say, the power, especially the effective power, withdrawn by the system from the in particular public supply 10 is detected with the aid of the four-quadrant energy counter 9, in particular the active power sensor; it is supplied as actual value to a controller, which regulates this actual value to the setpoint value of zero by appropriate actuation of control 8 of switch S. In this manner as little energy as possible is withdrawn from the in particular public AC electric energy supply 10 and, given high solar radiation, the excess energy is supplied predominantly into energy storage 7. Only when energy storage 7 has been charged and if excess photovoltaically generated energy is still available, will this energy be injected into the in particular public AC electric power supply 10.

If no photovoltaically generated power is available or barely any is available, power from energy storage 7 is supplied to consumers of the system and as little as possible from the in particular public AC electric power supply 10. Only when energy storage 7 is depleted and inverter 6 is unable to supply sufficient power will power be routed to the consumers of the system from the in particular public AC electric power supply 10.

In one further exemplary embodiment according to the present invention, the charge controller has an inverter which is actuated in a pulse-width modulated manner, the inverter's DC-side terminal being supplied by a rectifier of the charge controller. The AC-voltage-side output of the inverter is rectified by a further rectifier and charge voltage is thus provided to the energy storage. This makes it possible to detect the charge current and the charge voltage with the aid of the charge controller using its respective sensors, and energy storage 7 is charged to the maximum charge power.

LIST OF REFERENCE NUMERALS

1 photovoltaic system, in particular solar modules
2 inverter
3 input counter
4 consumers, in particular washing machine, refrigerator, electric automobile
5 charge controller, in particular including a rectifier
6 inverter
7 energy storage
8 control 9 four-quadrant energy counter, in particular active power sensor
10 in particular public AC electric power supply
S switch

The invention claimed is:

1. A method for controlling a power of a system that includes an electric energy source, an electric consumer, an energy storage, an inverter, and a charge controller, the method comprising:
connecting the system via an interconnected power sensor to a public AC electric power supply, the interconnected power sensor capable of one of:
ascertaining a power withdrawn by the system from the public AC electric power supply, and
ascertaining a quantity corresponding to the withdrawn power; and
transmitting a sensor signal to a controller that regulates a power supply from the public AC electric power supply toward zero by appropriate actuation of the inverter and the charge controller;
wherein if a photovoltaically generated electric power exceeds a power consumed by the electric consumer:
the controller controls the charge controller in such a way that excess power is routed to the energy storage and only power that is in excess thereof is injected into the public AC electric power supply; and
the inverter is at least one of switched into a quiescent state, deactivated, and switched off by the controller; and
wherein if the photovoltaically generated electric power drops below the power consumed by the electric consumer:
the controller controls the inverter in such a way that the electric consumer is supplied with power from the energy storage and only power required by the electric consumer in excess of the photovoltaically generated electric power and the power supplied from the energy storage is supplied by the public AC electric power supply; and
the controller at least one of switches the charge controller into a quiescent state, deactivates the charge controller, and switches the charge controller off.

2. The method as recited in claim 1, wherein the corresponding quantity includes an active power withdrawn from the public AC electric power supply.

3. The method as recited in claim 1, wherein the electric energy source includes one of a photovoltaic system and a regenerative energy source.

4. The method as recited in claim 3, wherein the regenerative energy source includes wind power.

5. The method as recited in claim 1, wherein the inverter and the charge controller are activated alternatively.

6. The method as recited in claim 1, wherein a hysteresis is taken into account when actuating at least one of the charge controller and the inverter.

7. The method as recited in claim 1, wherein a signal electronics system of the inverter carries out a charge control for the energy storage.

8. The method as recited in claim 7, wherein the signal electronics system is situated in a housing of the inverter.

9. The method as recited in claim 1, further comprising:
providing a sensor for detecting a temperature of the energy storage; and
supplying a sensor signal of the temperature detecting sensor to a signal electronics system of the inverter, so that a temperature-dependent charge control is able to be implemented for the energy storage.

10. A device for controlling a power of a system that includes an electric energy source, an electric consumer, an energy storage, an inverter, and a charge controller, the device comprising:
a power sensor interconnected between the system and a public AC electric power supply, the power sensor one of:
ascertaining a power withdrawn by the system from the public AC electric power supply, and
ascertaining a quantity corresponding to the withdrawn power, wherein a sensor signal from the power sensor is supplied to a controller which controls the power withdrawn from the public AC electric power supply towards zero by appropriate control of at least one of the inverter and the charge controller via a control path;
wherein if a photovoltaically generated electric power exceeds a power consumed by the electric consumer:
the controller controls the charge controller in such a way that excess power is routed to the energy storage and only power that is in excess thereof is injected into the public AC electric power supply; and
the inverter is at least one of switched into a quiescent state, deactivated, and switched off by the controller; and
wherein if the photovoltaically generated electric power drops below the power consumed by the electric consumer:
the controller controls the inverter in such a way that the electric consumer is supplied with power from the energy storage and only power required by the electric consumer in excess of the photovoltaically generated electric power and the power supplied from the energy storage is supplied by the public AC electric power supply; and
the controller at least one of switches the charge controller into a quiescent state, deactivates the charge controller, and switches the charge controller off.

11. The device as recited in claim 10, wherein the corresponding quantity includes an active power withdrawn from the public AC electric power supply.

12. The device as recited in claim 10, wherein the controller includes a housing disposed in a signal electronics system.

13. The device as recited in claim 10, wherein the control path from a direction of the controller has a selector switch, so that either the inverter or the charge controller is activated.

14. The device as recited in claim 13, wherein a hysteresis is provided during the activation.

15. The device as recited in claim 10, wherein a signal electronics system of the inverter is situated inside a housing of the inverter.

16. The device as recited in claim 10, further comprising:
a sensor for detecting a temperature of the energy storage, wherein a sensor signal of the temperature detecting sensor is supplied to a signal electronics system of the inverter, so that a temperature-dependent charge control is able to be implemented for the energy storage.

* * * * *